US008635556B2

(12) United States Patent
Lalancette et al.

(10) Patent No.: US 8,635,556 B2
(45) Date of Patent: Jan. 21, 2014

(54) HUMAN READABLE ICONIC DISPLAY SERVER

(75) Inventors: Richard Lalancette, Ottawa (CA); Mike Elias, Brooklyn, NY (US); Stephen Nelson West, Ottawa (CA)

(73) Assignee: Alcatel Lucent, Paris (FR)

( * ) Notice: Subject to any disclaimer, the term of this patent is extended or adjusted under 35 U.S.C. 154(b) by 529 days.

(21) Appl. No.: 12/956,555

(22) Filed: Nov. 30, 2010

(65) Prior Publication Data
US 2012/0137256 A1 May 31, 2012

(51) Int. Cl.
*G06F 3/048* (2013.01)
*G06Q 10/00* (2012.01)

(52) U.S. Cl.
USPC ............................................ 715/846; 705/5

(58) Field of Classification Search
USPC .................................. 705/5; 715/846; 340/4.6
See application file for complete search history.

(56) References Cited

U.S. PATENT DOCUMENTS

| 5,796,396 | A | 8/1998 | Rich |
| 7,275,689 | B2 | 10/2007 | Mak |
| 2002/0009978 | A1* | 1/2002 | Dukach et al. ................... 455/99 |
| 2004/0260470 | A1* | 12/2004 | Rast ............................. 701/300 |
| 2004/0266460 | A1* | 12/2004 | Reynolds ...................... 455/457 |
| 2005/0086490 | A1 | 4/2005 | Zhelev |
| 2005/0216286 | A1* | 9/2005 | Kalinichenko et al. ............ 705/1 |
| 2006/0026197 | A1* | 2/2006 | Quinn et al. ............... 707/103 R |
| 2006/0065733 | A1 | 3/2006 | Lee et al. |
| 2007/0024631 | A1* | 2/2007 | Cazier et al. ................... 345/581 |
| 2007/0136095 | A1* | 6/2007 | Weinstein .......................... 705/2 |
| 2007/0266114 | A1* | 11/2007 | Heo ............................... 709/217 |
| 2009/0077653 | A1* | 3/2009 | Osborn et al. .................... 726/17 |
| 2009/0141986 | A1 | 6/2009 | Boncyk et al. |
| 2009/0177502 | A1* | 7/2009 | Doinoff et al. ..................... 705/5 |
| 2010/0317377 | A1* | 12/2010 | Zou et al. ....................... 455/466 |
| 2011/0026716 | A1* | 2/2011 | Tang et al. ..................... 380/284 |
| 2011/0090249 | A1* | 4/2011 | Sheba et al. ................... 345/629 |
| 2011/0099040 | A1* | 4/2011 | Felt et al. ...................... 705/7.12 |
| 2011/0135207 | A1 | 6/2011 | Flynn et al. |
| 2011/0301985 | A1* | 12/2011 | Camp et al. ....................... 705/5 |

FOREIGN PATENT DOCUMENTS

WO WO 96/13021 * 5/1996

OTHER PUBLICATIONS

Non-Final Office Action dated Mar. 15, 2013 in related U.S. Appl. No. 12/956,714.

* cited by examiner

*Primary Examiner* — Nicholas Ulrich
(74) *Attorney, Agent, or Firm* — Kramer & Amado P.C.

(57) ABSTRACT

The invention is directed to providing a method and system for managing a human-readable icon associated with a user for displaying the human-readable icon on one or more target displays in response to a request for a service from the user. An icon server is used to manage and validate a unique human readable icon. The publicly-viewable human-readable icon can provide confirmation to the user for a request for service while providing a level of anonymity.

22 Claims, 4 Drawing Sheets

402  404  406  408

410  412

414  416

HUMAN READABLE ICONIC DISPLAY SERVER

FIELD OF THE INVENTION

The invention is directed to a human readable iconic identification system and specifically, a cross-platform target identification system.

BACKGROUND OF THE INVENTION

There is often a need to identify a target in a target-rich environment. An example is when a traveler is arriving at an airport to be greeted by unknown hosts. Typically, the hosts hold up a paper sign with the traveler's name printed on it. Possible disadvantages of this system are lack of anonymity: all persons in the vicinity can read the traveler's name on the paper sign; there might be many such signs, often hand written and sometimes not very legible; it is relatively easy for a malicious third party to hold up a sign with the traveler's name to misdirect the traveler or to approach the host and purport to be the named traveler.

Therefore, a means of providing a more discreet but publicly visible means of alerting a target is highly desirable.

SUMMARY OF THE INVENTION

In general terms, embodiments of the present invention are directed to a personal icon, easily visible and easily distinguishable from other such icons; a system for sending representations of such an icon to a specific display from a plurality of displays accessible to the system, possibly including a copy of the icon local to a requester for verification purposes.

One aspect of an embodiment of the present invention provides a method of managing a human readable icon. The method comprises steps of: receiving a request for a service for a user; associating the request with a human-readable icon for the user; and sending the human-readable icon to a display upon grant of the request.

In some embodiments the request comprises an identifier associated with the user.

In some embodiments the associating step further comprises a step of retrieving the human-readable icon from an icon database using the identifier.

In some embodiments the step of receiving a request comprises receiving the request from a service provider.

In some embodiments the step of receiving a request comprises receiving the request from a user-operable device.

In some embodiments the user-operable device comprises a portable device.

Some embodiments further comprise a step of selecting the display from among a plurality of displays.

In some embodiments the display is at a point of service.

In some embodiments the step of sending the icon comprises sending the icon to one or more of the plurality of displays.

In some embodiments the one or more of the plurality of displays are arranged to direct the user spatially.

In some embodiments the one or more of the plurality of displays are mobile.

In some embodiments one of the plurality of displays comprises a display on the user-operable device.

In some embodiments the service comprises a taxi service and wherein the step of selecting comprises selecting a taxi and wherein the one or more of the plurality of displays comprise a rooftop display and a dashboard mounted driver display of the taxi.

In some embodiments the associating step further comprises a step of verifying the human-readable icon is unique among icons stored on the icon database.

In some embodiments the human-readable icon is selected from a predefined set of unique human-readable icons stored on the icon database.

Another aspect of an embodiment of the present invention provides a program storage device readable by a machine, tangibly embodying a program of instructions executable by the machine to perform the method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
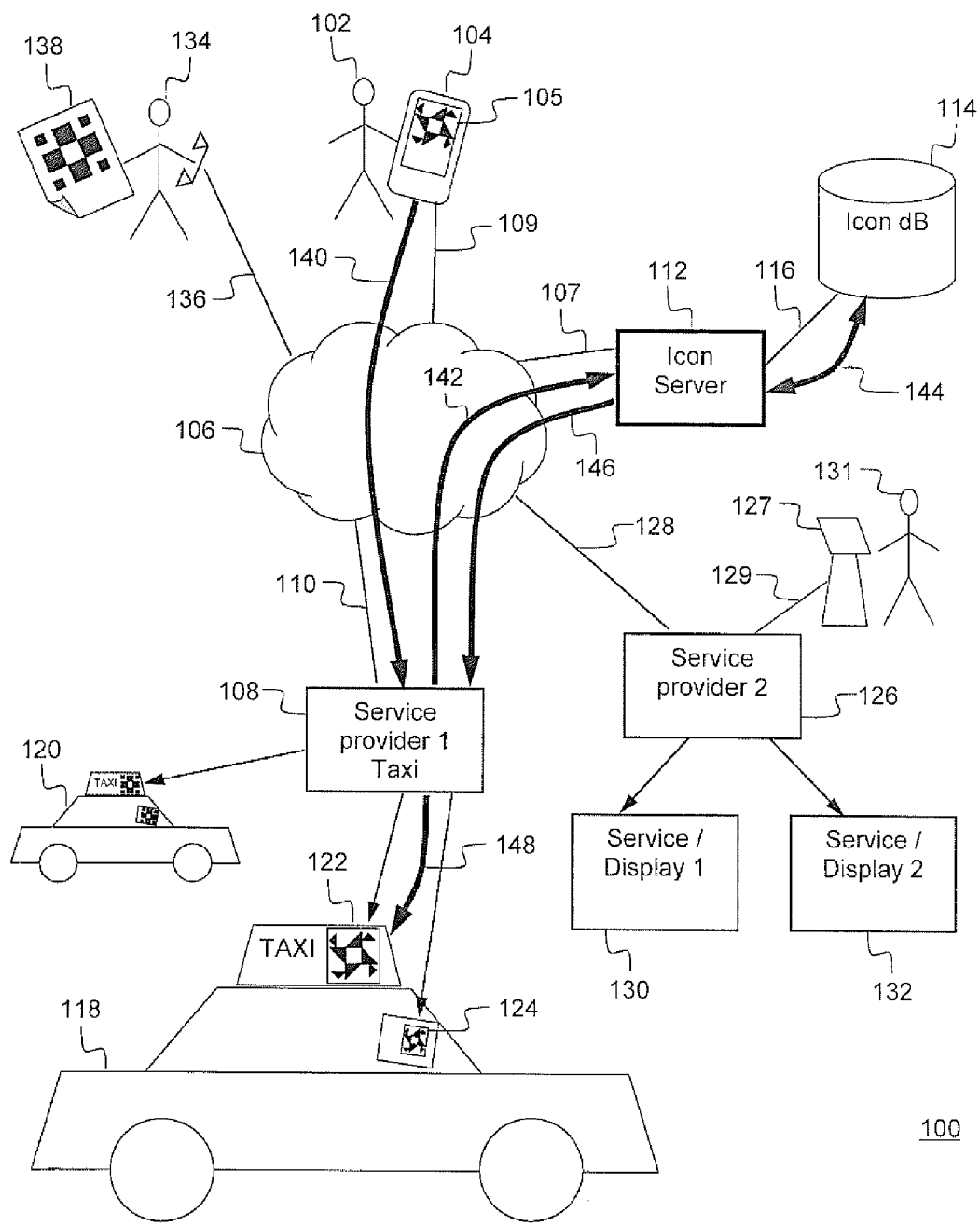
FIG. 1 illustrates a network configuration of embodiments of the present invention.

A system for managing a human-readable personal icon is useful for a variety of services and scenarios. A personal icon can be considered unique to an individual and used for identification purposes. FIG. 1 illustrates a network configuration 100 having a central icon server 112 in communication with an icon database 114 via communication link 116. Icon server 112 is accessible to telecommunications network 106 via link 107 and by extension, accessible to service providers which have access to network 106. User 102 can access telecommunications network 106 using smart phone 104 via communication link 109. A taxi dispatch service 108 is accessible to customers from telecommunications network 106 via communications link 110. The taxi dispatch service can be equipped with functionality to track the location of taxi cars 118 and 120 in its fleet to facilitate selection of taxi cars to respond to user requests. Taxi car 120 is equipped with electronic display 122 mounted outside of the taxi car or at least visible from outside the taxi car as well as a dash-mounted driver display 124. Displays 122 and 124 are configured to display information received from taxi dispatch service 108.

Other services providers, represented by "service provider 2" 126, having electronic displays 130, 132 which are configured to display information from service provider 126. Service provider 126 is accessible to customers or users from telecommunications network 106 via communications link 128.

In one scenario, user 102 orders a taxi (message 140) by using handset 104 to request taxi service from a taxi dispatch service ("service provider 1" 108) via communication link 109. Handset 104 can be a mobile telephone or a smart phone or a communication device having the ability to send and receive digital information. User device 104 conveys a user identification (user ID) such as for example, a calling number display information, a Media Access Control address (MAC address), an Internet Protocol (IP) address, or other identifier associated with handset 104 to service provider 108. Communication links 109 and 110 can be web or Internet connections and can be wired or wireless. Telecommunication equipment at service provider 108 recognizes the user ID using mechanisms well known to persons skilled in the art. The request for service can also include a location of the user or other information useful for a request for service. Location information can be provided via GPS (Global Positioning System) coordinates retrieved by the user's (102) smart phone 104 and transmitted along with the request for service to service provider 108. A smart phone is considered a wireless mobile telephone having computing ability in addition to basic voice service and having an operating system to provide a platform to execute software applications developed independently from the manufacturer of the mobile telephone. Smart phones typically are portable, handheld, have a display screen 105, user input mechanism and memory for storing data and software applications.

Service provider 108 then validates the request for service to ensure the request can be accommodated. An automated dispatch system at service provider 108 compares the user (102)'s location against the known locations of taxi cars (118, 120) and preferably, available taxi cars managed by the service provider 108, to select the most suitable taxi car 118 to respond to the request for service from user 102, as would be well understood by persons skilled in the art.

Service provider 108 then requests a personal human-readable icon for user 102, from icon server 112 by sending message 142, carrying a user ID for user 102. Icon server 112 uses the user's (102) user ID as a key to the database and retrieves a personal icon corresponding to user 102 from icon database (dB) 114 via message interaction 144. The retrieving step validates the request by determining if the request returns a valid icon. The icon server 112 thus provides a validation of icons to help ensure that other users can not use an icon associated with user 102. If the retrieving step fails to return an icon, an appropriate error message is reported back to service provider 108.

When an icon is successfully retrieved, the icon server 112 sends the retrieved icon to service provider 108 via message 146. The service provider 108 then dispatches the selected taxi car 118 to the location of user 102 and displays the user's icon on the taxi roof-top electronic display 122 and to the driver's dashboard display 124. The service provider 108 also transmits a copy of the icon to user device 104 for confirmation to the user. In one embodiment, as part of the dispatch procedure, the service provider 108 transmits the dispatch information and the user's icon to a mobile computer in taxi car 118 and the mobile computer manages the taxi roof-top electronic display 122 and to the driver's dashboard display 124.

When taxi car 118 approaches user (102)'s location, user 102 can view the rooftop display 122 to identify taxi car 118 as being the taxi responding to user (102)'s request, from among other taxi cars in the vicinity. This can be especially useful in situations where there are a large number of similar looking taxi cars in one location. The user can compare the display of the icon on rooftop display 122 to the copy of the icon on the user's device 104 to confirm the identity of the taxi. The user 102 then attracts the attention of the driver and when the taxi stops at the user (102)'s location, the user 102 can show the driver the copy of the icon on the user device 104 which the driver can compare to the copy of the icon displayed on the driver's dashboard display 124. This scenario illustrates how embodiments of the present invention can be used advantageously to help a user identify a taxi the user requested, help a taxi driver identify the user who requested the taxi, while maintaining a certain level of anonymity compared to displaying for example, the name of the user on the taxi rooftop display. In this scenario, the taxi roof-top electronic display 122 and to the driver's dashboard display 124 are considered target displays.

In an other embodiment of the present invention, user 134 orders a taxi by using a voice handset 104 to request taxi service from a taxi dispatch service ("service provider 1" 108) via communication link 136. Thus user 134 communicates verbally with an operator at service provider 108. User 134 verbally communicates a user identification such as a name, telephone number, address, customer number, etc. If not already provided, the user can verbally communicate location information such as an address or intersection. The service provider 108 then validates the request, assigns taxi 120 and retrieves the icon for user 134 similarly to the process previously described for user 102.

When taxi car 120 approaches user (134)'s location, user 134 can view the rooftop display 122 to identify taxi car 118 as being the taxi responding to user (134)'s request, from among other taxi cars in the vicinity. The user 134 can compare the display of the icon on rooftop display of taxi 120 to a hard copy 138 of user (134)'s icon to confirm the identity of the taxi. The user 134 then attracts the attention of the driver of taxi 120 and when the taxi stops at the user (134)'s location, the user 134 can show the driver the copy of the hard copy 138 of user (134)'s icon which the driver can compare to the copy of the icon displayed on the driver's dashboard display of taxi 120.

In another scenario, a user 131 is in an institution providing customer service (service provider 126), such as in a financial institution, a healthcare facility, a retail store such as a delicatessen counter, a government office such as a motor vehicle bureau or customs checkpoint or other such environment where one or more service counters are arranged to serve a plurality of users or customers. Embodiments of the present invention can be used as part of a customer queue management system. The user 131 requests a service, for example from an electronic kiosk 127 in communication with service provider 126. In some scenarios there is only a single service (Service/Display 130 or 132) to select from, in others, different service counters (Service/Display 130 and 132) can provide different services (for example, in a motor vehicle bureau, service counter 130 can handle driver licenses and service counter 132 can handle vehicle registrations). The user 131 provides an identifier such as a name, phone number, driver's license number, social security number or passport number to an electronic kiosk 127, which then transmits the information to service provider 126 which in turn accesses icon server 112 to retrieve a human-readable icon associated with the user. When service provider system 126 determines that service counter 130 is ready to serve user 131, the service provider system 126 sends the retrieved human-readable icon for user 131 to the display device at service counter 130. User 131 can then see his personal human-readable icon displayed at counter 130 and can then proceed to the counter for service.

Note that in some embodiments, the icon server 112 can be incorporated into service provider system 126. In other embodiment, the icon server service 112 is an independent entity which serves human readable-icons to a plurality of service providers 108, 126 and plurality of types of service providers.

In yet another scenario, user 102 is in a shopping mall or other public space having a system (service provider 126) managing multiple programmable public displays 130, 132, such as large video or graphic display panels located along the walls of a shopping mall or on building along a street. User 102 requests directions from service provider 126 to a destination such as a specific store, service or location from the system/service provider 126 via a mobile cellular telephone 104. Service provider then retrieves request the user's human-readable icon from icon server 112 as previously described. The service provider 126 then displays the user's icon along with arrows or other indications, on selected displays to identify a route to the requested destination. All selected displays can be activated simultaneously along the calculated route. Alternatively, the displays 130 and 132 can display the user icon sequentially starting from a display close to a user and then proceeding to other displays one by one. The user's location can be tracked using GPS (Global Positioning System) information from the user's cellular telephone or other location determining means. Then only the displays close to the user will show the user's icon.

Figure 2:
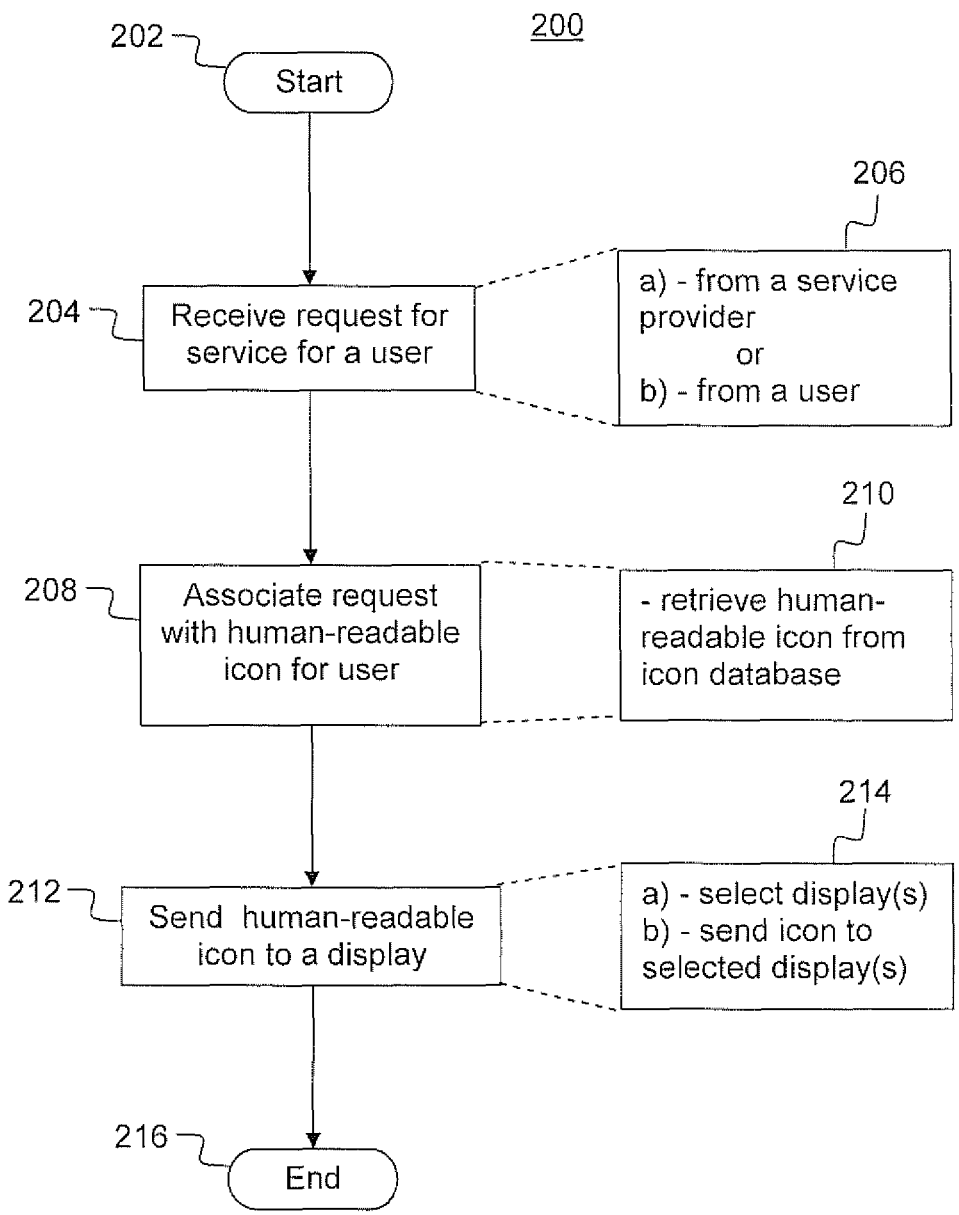
FIG. 2 illustrates a general overview of a method of managing a human-readable icon from a server according to an embodiment of the present invention.

An embodiment of an aspect of a method 200 of the present invention from the point of view of a server is described with reference to FIG. 2. The process starts at step 202. At step 204, the server receives a request for a service for a user, for example, a person ordering a taxi from a taxi dispatch service. At step 208 the server associates the request for service for a user with a human-readable icon associated with the user. At step 212, the server sends the human-readable icon to a target display. In some embodiments, the server is a service provider which receives the request directly from a user (206b) and then accesses an icon server to associate the icon by retrieving the icon from the icon server (210). The icon server can be part of the server or in other embodiments, the icon server can be separate from the server. In other embodiments the server receives the request for service from a user via a service provider (206a). The step of sending the human-readable icon 212 to a display also comprises a step of first selecting one or more displays (214a). Selecting displays is often related to selecting a specific service. For example, a taxi dispatch service will determine the appropriate taxi car to respond to the user's request after which the taxi dispatch service will send the user icon information to one or more displays (214b) on that taxi car. If the user has a portable device with a display, the service provider can also send (214b) the icon to the user's device. The process ends at step 216.

Figure 3:
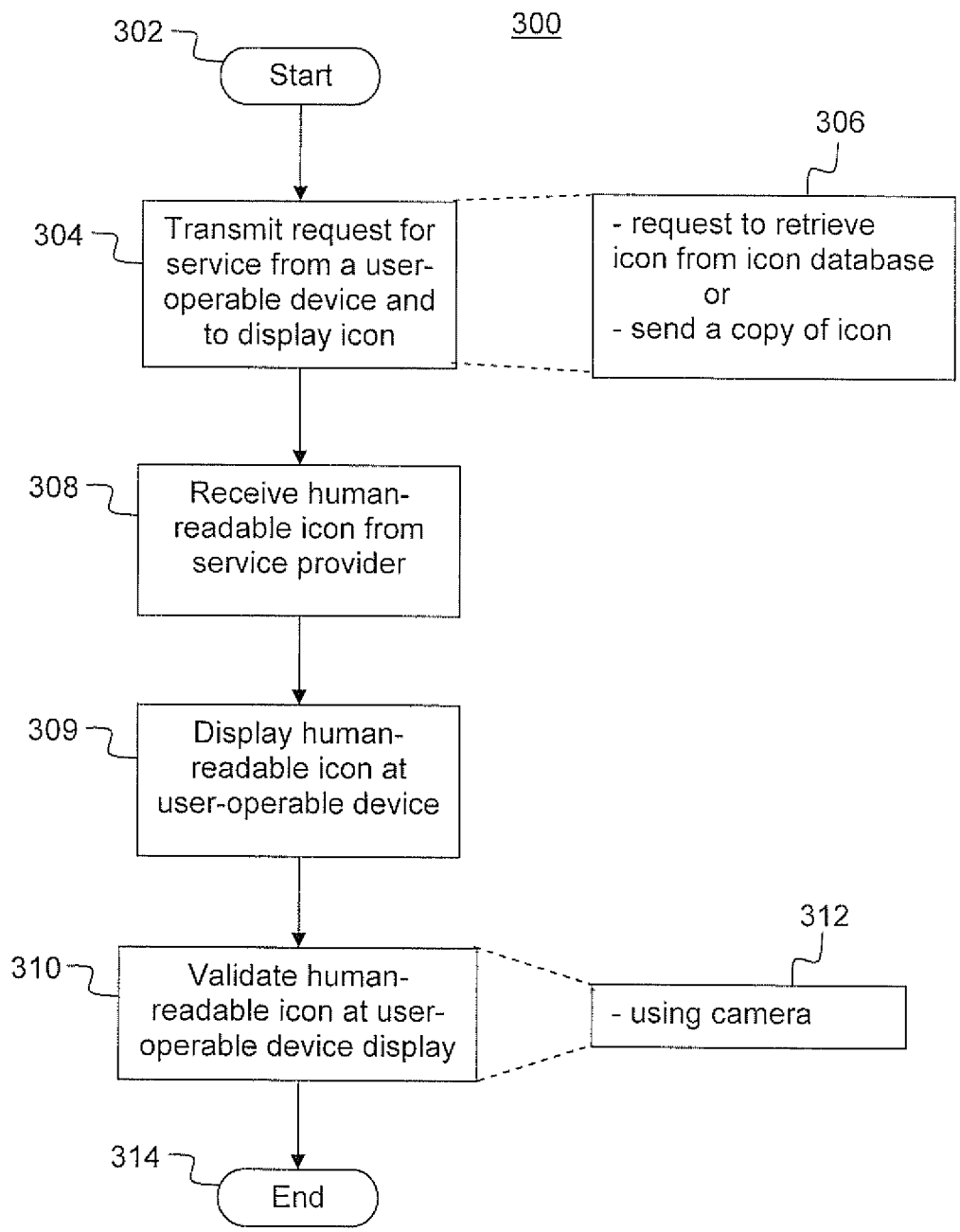
FIG. 3 illustrates a general overview of a method of managing a human-readable icon from a user-operable device according to an embodiment of the present invention.

An embodiment of an aspect of a method 300 of the present invention from the point of view of a user-operable device is described with reference to FIG. 3. The process starts at step 302. At step 304, a request for service for a user is transmitted from a user-operable device. The request also implies a request to display a human-readable icon on a target display. At step 306, the request can also imply a request to retrieve a human-readable icon from an icon database. In other embodiments, a copy of a human-readable icon is included with the request for service, in which case the request can imply a request to validate the human-readable icon at an icon database instead of receiving the icon at the icon database. In some embodiments, the process continues to step 308 where the user-operable device receives a human-readable icon from an icon database. At step 309 the received human-readable icon is displayed at the user-operable device. This is useful to allow the user to confirm the retrieved icon or to refresh the user's memory as to what the icon looks like. In embodiments where the user-operable device is a portable device, the received icon can be used to confirm the user's identity by showing the received icon to person providing the requested service.

In some embodiments, at step 310 the user-operable device validates a human-readable icon displayed on the target display with the icon received at step 308 by photographing or sensing the representation of the human-readable icon the displayed at a target display using a camera 312 internal to or connected with, the user-operable device and comparing the icons using, for example statistical pattern recognition algorithms at the user-operable device. Alternatively, the pattern recognition process can be performed at an external location. The process ends at step 314.

Human-readable icons of the present invention could be selected from a preconfigured collection of unique human-readable icons stored in the icon database 114. These icons could be designed in advance and selected for uniqueness and to be easily distinguishable. Alternatively, the human-readable icons can be user-defined in advance. Using a simple graphical editing tool on a computer, a user can design a new icon for use with this system. Once the new icon is designed it can be submitted by the user to icon server 112 for validation to verify that the icon does not already exist in database 114 and that the icon is sufficiently visually distinguishable over other icons in the database 114, using for example, statistical pattern recognition techniques.

Human-readable icons can be geometric to facilitate automated or assisted generation of icons. For example an automated icon generator using a pseudo-random number generator using for example an IP address or phone number or user-provided string as a seed to generate a random number which can be used to generate a simple geometric pattern. The simplicity of the pattern would aid in the human-readability of these icons and making such a pattern easy to recognize and distinguish over other patterns especially in situations where multiple icons can be on display in a particular area.

Figure 4:
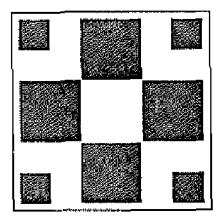
FIG. 4 illustrates examples of human-readable icons according to embodiments of the present invention.
Figure 4:
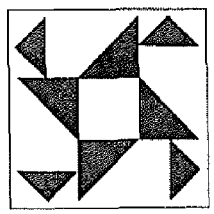
Figure 4:
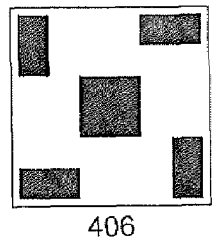
Figure 4:
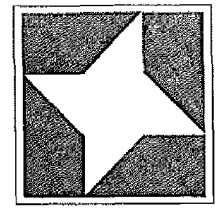
Figure 4:
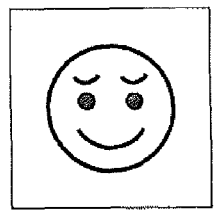
Figure 4:
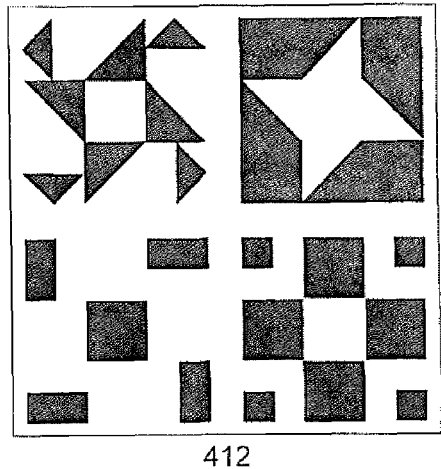
Figure 4:
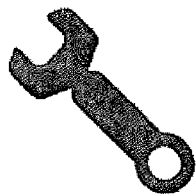
Figure 4:

As an example, simple human-readable icons can be generated in an 8×8 matrix or 16×16 matrix of squares or pixels or using other shapes as building blocks for a user icon. Some examples of possible human-readable icons are presented in FIG. 4. A personal human-readable icon could be a single simple static icon 402, 404, 406, 408, 410, 414, 416 or a combination 412 of simple icons in a specific configuration or could be animated as a series of icons or images sequentially displayed. A personal human-readable icon could also be a cartoon caricature 410, a sketch, a line drawing, a photograph (of a user or of an object or a scene), or other image which a user would be able to recognize easily. Human readable icons could be black and white or in color. Icons that are more easily recognizable from a distance and more easily distinguishable from other icons displayed in close proximity would more advantageous. Thus icons 410, 414, 416, 412 might be considered more advantageous than for example, icons 402, 404, 406, or 408.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiments of the invention described above without departing from the scope of the invention, which is defined in the claims.

What is claimed is:

1. A method of managing a humam readable icon, the method comprising steps of:
   receiving a request for a service for a user;
   associating said request with a human-readable icon for said user,
   wherein said human-readable icon is generated using an automated icon generator based on a pseudo-random number;
   sending said human-readable icon to a first display upon grant of said request,
   wherein said first display is user-viewable; and
   sending said human-readable icon to a second display, wherein said second display corresponds to a display on a user-operable device of said user.

2. The method of claim 1 wherein said request comprises an identifier associated with said user.

3. The method of claim 2 wherein said associating step further comprises a step of retrieving said human-readable icon from an icon database using said identifier.

4. The method of claim 3 wherein said step of receiving a request comprises receiving said request from a service provider.

5. The method of claim 1 wherein said step of receiving a request comprises receiving said request from said user-operable device.

6. The method of claim 5 wherein said user-operable device comprises a portable device.

7. The method of claim 1 further comprising a step of selecting said first display from among a plurality of displays.

8. The method of claim 7 wherein said first display is at a point of service.

9. The method of claim 7 wherein said step of sending said icon comprises sending said icon to one or more of said plurality of displays.

10. The method of claim 9 wherein said one or more of said plurality of displays are arranged to direct said user spatially.

11. The method of claim 9 wherein said one or more of said plurality of displays are mobile.

12. The method of claim 9 wherein one of said plurality of displays comprises a display attached to a vehicle.

13. The method of claim 9 wherein said service comprises a taxi service and wherein said step of selecting comprises selecting a taxi and wherein said one or more of said plurality of displays comprise a rooftop display and a dashboard-mounted driver display of said taxi.

14. The method of claim 3 wherein said associating step further comprises a step of verifying said human-readable icon is unique among icons stored on said icon database.

15. The method of claim 3 wherein said human-readable icon is selected from a predefined set of unique human-readable icons stored on said icon database.

16. The method of claim 1, wherein said pseudo-random number is generated using an internet protocol IP address, a phone number, or a user provided string.

17. A non-transitory program storage device readable by a machine, tangibly embodying a program of instructions executable by the machine to perform the method steps of claim 1.

18. A system of managing a human readable icon, the system comprising:
   at least one user-operable device; and
   a computer hardware processor programmed to perform steps, the steps comprising:
     receiving a request for a service for a user;
     associating said request with a human-readable icon for said user;
     sending said human-readable icon to a first display upon grant of said request and sending said human-readable icon to a second display,
     wherein said human-readable icon is generated using an automated icon generator based on a pseudo random number,
     wherein said first display is user-viewable, and
     wherein said second display corresponds to a display on a user-operable device of said user.

19. The system of claim 18 wherein said request comprises an identifier associated with said user.

20. The system of claim 19 wherein said associating step further comprises a step of retrieving said human-readable icon from an icon database using said identifier.

21. The system of claim 20 wherein said step of receiving a request comprises receiving said request from a service provider.

22. The method of claim 18, wherein said pseudo-random number is generated using an internet protocol (IP) address, a phone number, or a user provided string.

\* \* \* \* \*